United States Patent
Aldana

(10) Patent No.: US 9,445,227 B2
(45) Date of Patent: Sep. 13, 2016

(54) PASSIVE POSITIONING UTILIZING ROUND TRIP TIME INFORMATION

(71) Applicant: QUALCOMM Incorporated, San Diego, CA (US)

(72) Inventor: Carlos Horacio Aldana, Mountain View, CA (US)

(73) Assignee: QUALCOMM Incorporated, San Diego, CA (US)

(*) Notice: Subject to any disclaimer, the term of this patent is extended or adjusted under 35 U.S.C. 154(b) by 223 days.

(21) Appl. No.: 14/268,978

(22) Filed: May 2, 2014

(65) Prior Publication Data

US 2015/0063138 A1 Mar. 5, 2015

Related U.S. Application Data

(60) Provisional application No. 61/985,247, filed on Apr. 28, 2014, provisional application No. 61/973,034, filed on Mar. 31, 2014, provisional application No. 61/873,253, filed on Sep. 3, 2013, provisional application No. 61/872,087, filed on Aug. 30, 2013.

(51) Int. Cl.

| | |
|---|---|
| *H04W 4/02* | (2009.01) |
| *H04L 29/08* | (2006.01) |
| *H04W 24/02* | (2009.01) |
| *H04W 64/00* | (2009.01) |
| *H04W 24/10* | (2009.01) |
| *G01S 5/00* | (2006.01) |
| *G01S 5/02* | (2010.01) |
| *G01S 5/10* | (2006.01) |

(52) U.S. Cl.
CPC ............. *H04W 4/02* (2013.01); *G01S 5/0081* (2013.01); *G01S 5/021* (2013.01); *G01S 5/10* (2013.01); *H04L 29/08657* (2013.01); *H04L 67/18* (2013.01); *H04W 24/02* (2013.01); *H04W 24/10* (2013.01); *H04W 64/00* (2013.01); *H04W 64/003* (2013.01)

(58) Field of Classification Search
None
See application file for complete search history.

(56) References Cited

U.S. PATENT DOCUMENTS

| | | | |
|---|---|---|---|
| 6,061,337 | A | 5/2000 | Light et al. |
| 8,010,133 | B2 | 8/2011 | Cheok et al. |
| 8,547,870 | B2 | 10/2013 | Curticapean |

(Continued)

FOREIGN PATENT DOCUMENTS

| | | |
|---|---|---|
| CN | 102647263 A | 8/2012 |
| EP | 2046084 A1 | 4/2009 |

(Continued)

OTHER PUBLICATIONS

International Preliminary Report on Patentability—PCT/US2014/050309—European Patent Office—Berlin, Germany, Nov. 11, 2015, 10 pgs.

(Continued)

*Primary Examiner* — Ashley Shivers
(74) *Attorney, Agent, or Firm* — Hunter Clark PLLC

(57) ABSTRACT

Techniques for passive positioning of a client station are disclosed. In an example a passive positioning scheme may include detecting an incoming message from an access point, determining a Round Trip Time (RTT) value associated with the access point, generating an acknowledgment message, calculating a time of departure for the acknowledgment message based on the RTT value, and sending the acknowledgment message at the time of departure.

26 Claims, 12 Drawing Sheets

(56) References Cited

U.S. PATENT DOCUMENTS

| | | |
|---|---|---|
| 8,929,918 B2 | 1/2015 | Siomina et al. |
| 2004/0081127 A1 | 4/2004 | Gardner et al. |
| 2004/0230373 A1 | 11/2004 | Tzamaloukas |
| 2006/0089138 A1 | 4/2006 | Smith et al. |
| 2006/0133281 A1* | 6/2006 | Witherell ............. H04L 1/1854 370/238 |
| 2006/0285507 A1 | 12/2006 | Kinder et al. |
| 2007/0268856 A1 | 11/2007 | Wijting et al. |
| 2010/0128617 A1 | 5/2010 | Aggarwal et al. |
| 2010/0296495 A1 | 11/2010 | Iino et al. |
| 2011/0130149 A1 | 6/2011 | Yao et al. |
| 2011/0286469 A1* | 11/2011 | Yasuda ................... H04L 1/188 370/412 |
| 2011/0306358 A1 | 12/2011 | Alizadeh-Shabdiz et al. |
| 2012/0057481 A1* | 3/2012 | Kim .................... H04W 56/009 370/252 |
| 2012/0314587 A1 | 12/2012 | Curticapean |
| 2012/0315919 A1 | 12/2012 | Hirsch |
| 2013/0005347 A1 | 1/2013 | Curticapean |
| 2013/0121173 A1 | 5/2013 | Chen et al. |
| 2013/0170374 A1* | 7/2013 | Aljadeff ................. G01S 5/14 370/252 |
| 2014/0187259 A1 | 7/2014 | Kakani et al. |
| 2014/0213193 A1* | 7/2014 | Zhang .................... G01S 11/02 455/67.11 |
| 2015/0049716 A1* | 2/2015 | Gutierrez .............. H04W 84/12 370/329 |
| 2015/0063228 A1 | 3/2015 | Aldana |

FOREIGN PATENT DOCUMENTS

| | | |
|---|---|---|
| WO | 2013028629 A2 | 2/2013 |
| WO | 2013052077 A1 | 4/2013 |

OTHER PUBLICATIONS

International Preliminary Report on Patentability—PCT/US2014/050314—European Patent Office—Berlin, Germany, Nov. 11, 2015, 11 pgs.
Second Written Opinion from International Application No. PCT/US2014/050309, dated Jul. 16, 2015, 8 pp.
Second Written Opinion from International Application No. PCT/US2014/050314, dated Jul. 16, 2015, 10 pp.
International Search Report and Written Opinion—PCT/US2014/050309—ISA/EPO—Feb. 3, 2015, 14 pgs.
International Search Report and Written Opinion—PCT/US2014/050314—ISA/EPO—Feb. 5 ,2015 14 pgs.
Lindskog E (CSR Technology): "Client Positioning using Timing Measurements between Access Points; 11-13-0072-00-000m-client-positioning-using-timing-measurements-between-access-points", IEEE SA Mentor; 11-13-0072-00-000M-Client-Positioning-Using-Timing-Measurements-Between-Access-Points, IEEE-SA Mentor, Piscataway, NJ USA, vol. 802.11m, Jan. 12, 2013, pp. 1-13, XP068040470, [retrieved on Jan. 12, 2013] p. 4-p. 6 p. 11.
Gallo P., et al., "WIDAR: Bistatic WI-fi Detection and Ranging for off-the-shelf devices," IEEE 14th International Symposium and Workshops on a World of Wireless, Mobile and Multimedia Networks (WoWMoM), 2013, 6 pages.

* cited by examiner

PASSIVE POSITIONING UTILIZING ROUND TRIP TIME INFORMATION

CROSS-REFERENCE TO RELATED APPLICATIONS

This application claims the benefit of U.S. Provisional Application No. 61/872,087, entitled, "Passive Positioning Schemes," filed on Aug. 30, 2013, U.S. Provisional Application No. 61/873,253, entitled, "Passive Positioning Schemes," filed on Sep. 3, 2013, U.S. Provisional Application No. 61/973,034, entitled, "Passive Positioning Utilizing Beacon Neighbor Reports," filed Mar. 31, 2014, and U.S. Provisional Application No. 61/985,247, entitled, "Passive Positioning Utilizing Beacon Neighbor Reports," filed Apr. 28, 2014, each of which is assigned to the assignee hereof and the contents of which are incorporated herein by reference in their entirety.

BACKGROUND

Embodiments of the inventive subject matter generally relate to the field of wireless communication and, more particularly, to a passive positioning scheme for wireless communication devices.

Various positioning techniques can be employed for determining the position of a wireless communication device (e.g., a wireless local area network (WLAN) device) based on receiving wireless communication signals. For example, positioning techniques can be implemented that utilize time of arrival (TOA), the round trip time (RTT) of wireless communication signals, received signal strength indicator (RSSI), or the time difference of arrival (TDOA) of the wireless communication signals to determine the position of a wireless communication device in a wireless communication network.

SUMMARY

An example of a method for exchanging positioning messages between access points according to the disclosure includes detecting an incoming message from an access point, determining a Round Trip Time (RTT) value associated with the access point, generating an acknowledgment message, calculating a time of departure for the acknowledgment message based on the RTT value, and sending the acknowledgment message at the time of departure.

Implementations of such a method may include one or more of the following features. A First Arrival Correction (FAC) for the incoming message may be computed. The time of departure for the acknowledgment message may be based at least in part on the FAC. A Short Inter-Frame Space (SIFS) value may be determined, and calculating the time of departure may be based on the RTT value and the SIFS value. An equation for calculating the time of departure for the acknowledgment message may be $t3=t2+SIFS-RTT/2+L_M$, such that t3 is the time of departure, t2 is a time the incoming message is detected, SIFS is the Short Inter-Frame Space associated with the access point, RTT/2 is a time difference between a time instance when the incoming message was sent and a time instance when the incoming message is detected, and $L_M$ is a length of the incoming message. A message length of the incoming message may be determined. The incoming message may be a Quality of Service Null (QoSNull) exchange.

An example of a method of positioning on a client station utilizing inter-access point messaging according to the disclosure includes detecting, at a client station, a broadcast message from a first access point indicating a message exchange with a second access point, detecting a first message sent from the first access point to the second access point, detecting a subsequent second message sent from the second access point to the first access point, determining location information associated with the first access point and the second access point, determining a Short Inter-Frame Space (SIFS) value, determining a message length value for the first message, determining time difference of arrival (TDOA) information based, at least in part, the detecting of the first message and the subsequent second message, and calculating a position estimate based on the location information associated with the first access point and the second access point, the TDOA information, the SIFS value, and the message length value.

Implementations of such a method may include one or more of the following features. The first message may be a fine timing message or a QoSNull message. The broadcast message may include the location information associated with the first access point and the second access point, the Round Trip Time (RTT) information associated with the first access point and the second access point, and/or the SIFS value.

An example of a system to exchange messages for use in passive positioning of a mobile unit includes a memory unit, at least one processor coupled to the memory unit and configured to detect an incoming message from an access point, determine a Round Trip Time (RTT) value associated with the access point, generate an acknowledgment message, calculate a time of departure for the acknowledgment message based on the RTT value, and send the acknowledgment message at the time of departure.

Implementations of such a system may include one or more of the following features. The processor may be further configured to compute a First Arrival Correction (FAC) for the incoming message. The processor may be further configured to calculate the time of departure for the acknowledgment message based at least in part on the FAC. The processor may be further configured to determine a Short Inter-Frame Space (SIFS) value and calculate the time of departure based on the RTT value and the SIFS value. The time of departure for the acknowledgment message may be determined as $t3=t2+SIFS-RTT/2+L_M$, such that t3 is the time of departure, t2 is a time the incoming message is detected, SIFS is the Short Inter-Frame Space associated with the access point, RTT/2 is a time difference between a time instance when the incoming message was sent and a time instance when the incoming message is detected, and $L_M$ is a length of the incoming message. A message length of the incoming message may be determined. The incoming message from the access point may be a QoSNull message.

An example of a machine-readable storage medium according to the disclosure includes instructions, which when executed by a one or more processors causes the one or more processors to perform operations including detecting an incoming message from an access point, determining a Round Trip Time (RTT) value associated with the access point, generating an acknowledgment message, calculating a time of departure for the acknowledgment message based on the RTT value, and sending the acknowledgment message at the time of departure.

Implementations of such a machine-readable storage medium may include one or more of the following features. The instructions may cause the one or more processors to perform operations including computing a First Arrival Correction (FAC) for the incoming message. The operation for calculating the time of departure for the acknowledgment message may be based at least in part on the FAC. The instructions may cause the one or more processors to perform operations including determining a Short Inter-Frame Space (SIFS) value, and the operation for calculating the time of departure may be based on the RTT value and the SIFS value. The instructions may cause the one or more processors to perform operations including determining a message length of the incoming message. The operation for detecting the incoming message from the access point may include detecting that the incoming message is a QoSNull exchange.

An example of a client station according to the disclosure a processor, a positioning unit coupled to the processor and configured to detect a broadcast message from a first access point indicating a message exchange with a second access point, detect a first message sent from the first access point to the second access point, detect a subsequent second message sent from the second access point to the first access point, determine a location information associated with the first access point and the second access point, determine a Short Inter-Frame Space (SIFS) value, determine a message length value for the first message, determine time difference of arrival (TDOA) information based, at least in part, the detecting of the first message and the subsequent second message, and calculate a position estimate based on the location information associated with the first access point and the second access point, the TDOA information, the SIFS value, and the message length value.

Implementations of such a client station may include one or more of the following features. The positioning unit may be configured to detect a fine timing message or a QoSNull message as the first message. The positioning unit may be configured to detect the location information associated with the first access point and the second access point in the broadcast message. The positioning unit may be configured to detect Round Trip Time (RTT) information associated with the first access point and the second access point in the broadcast message. The positioning unit may be configured to detect the SIFS value in the broadcast message.

Items and/or techniques described herein may provide one or more of the following capabilities, as well as other capabilities not mentioned. Access Points (APs) in a network exchange periodic fine timing or QoSNull messages with neighboring APs. APs broadcast their locations. The time a message (M) leaves a first AP (AP1) is determined. The time of arrival of the message (M) at a second AP (AP2) is determined. A First Arrival Correction (FAC) is used to adjust the time of arrival at the second AP (AP2). An acknowledgment (ACK) of the message (M) is sent from the second AP (AP2) back to the first AP (AP1). A client station detects the message (M) and the acknowledgment (ACK) and determines the respective times of arrival at the client station. An AP determines Round Trip Time (RTT) information associated with the transmission time between two APs (e.g., $RTT_{12}/2$). An AP broadcast RTT information and SIFS information. The position of the client can be determined based on the times of arrival and the RTT and SIFS information. Other capabilities may be provided and not every implementation according to the disclosure must provide any, let alone all, of the capabilities discussed. An AP does not broadcast the RTT information, but modifies the time the ACK message is sent based on the RTT information. A client position is determined without receiving the broadcast RTT information. Further, it may be possible for an effect noted above to be achieved by means other than that noted, and a noted item/technique may not necessarily yield the noted effect.

DETAILED DESCRIPTION

Figure 1A:
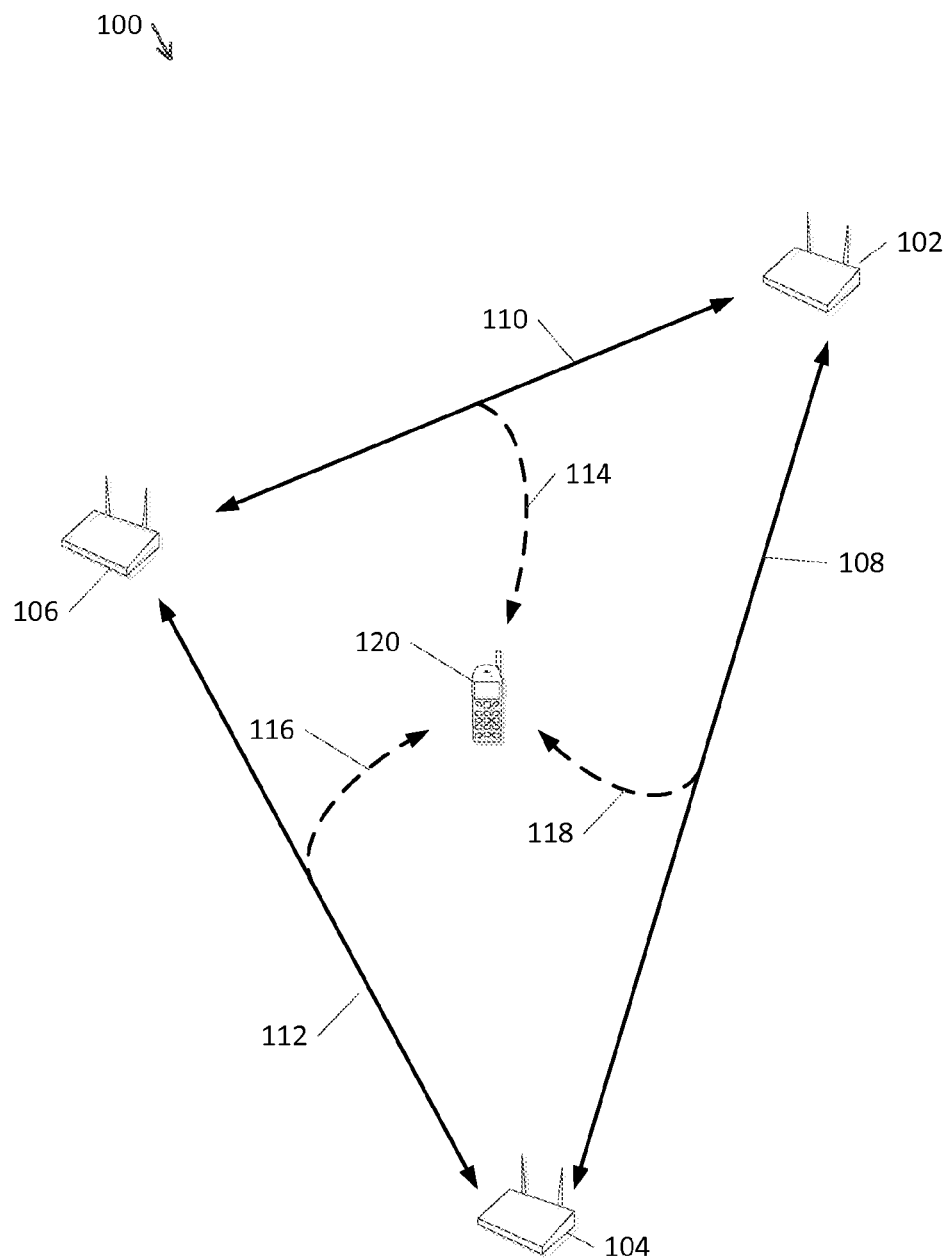
FIG. 1A is an example block diagram of a passive positioning scheme for determining the position of a client station.

The description that follows includes exemplary systems, methods, techniques, instruction sequences, and computer program products that embody techniques of the present inventive subject matter. However, it is understood that the described embodiments may be practiced without these specific details. For instance, although examples refer to a passive positioning scheme for wireless local area network (WLAN) devices, embodiments are not so limited. In other embodiments, the passive positioning scheme can be implemented by other wireless standards and devices (e.g., WiMAX devices). In other instances, well-known instruction instances, protocols, structures, and techniques have not been shown in detail in order not to obfuscate the description.

In wireless communication networks, determining the position of an electronic device with wireless communication capabilities (e.g., within an indoor or outdoor environment) can be a desired feature for users of the communication device (e.g., mobile phone users) and operators of the wireless communication network. In some systems, round-trip time (RTT) techniques can be implemented for determining the position of the communication device. For example, the communication device can transmit a request message to multiple access points and can receive a response message from each of the access points. The range between the communication device and each of the access points can be determined by measuring the round trip time between the request messages and the corresponding response messages. The position of the communication device can be determined. In some systems, time difference of arrival (TDOA) techniques can be implemented for determining the position of the communication device. For example, the communication device can determine its position based on the difference between the ranges from each of the access points to the communication device. However, the onus for initiating the RTT positioning operations (or the TDOA positioning operations) (e.g., transmitting the request message to the access points) typically lies on the communication device.

Because the communication device plays an active role in transmitting the request messages to each access point, the communication device may consume a substantial amount of bandwidth and power. Moreover, if the wireless communication network comprises multiple such communication devices, each communication device may be required to execute the RTT positioning operations (or the TDOA positioning operations), increasing the traffic load in the wireless communication network.

A position calculation unit of the communication device can be configured to determine the position of the communication device based on a passive positioning scheme to reduce the traffic load in the wireless communication network. The access points in the wireless communication network can be configured to exchange fine timing or QoSNull messages (e.g., on-demand or periodically) with one or more neighboring access points (i.e., a target access point) in the wireless communication network. The access point can determine RTT timing information associated with the one or more neighboring access points based on the time difference between a message (M) transmitted, and a corresponding acknowledgment (ACK) response message transmitted by the target access point. The position calculation unit can intercept the message (M) and the corresponding ACK message, and can determine TDOA timing information based on the time difference of arrival between the message (M) and the corresponding ACK message. The access points can also transmit an RTT measurement message comprising the RTT timing information to the communication device. The position calculation unit can then determine the position of the communication device based, at least in part, on the TDOA timing information, the RTT timing information, and position information associated with a predetermined number of network access points. In an embodiment, the access points can be configured to adjust the timing of the ACK message based on the RTT information and do not transmit an RTT measurement message to the client station.

A passive positioning scheme for determining the position of the communication device can eliminate transmissions initiated by the communication device for calculating the position of the communication device. This can minimize the impact of the communication device transmissions on the traffic load of the wireless communication network. Furthermore, because the communication device can passively listen for (and detect) the fine timing or QoSNull message exchanges and the RTT measurement message, the passive positioning scheme may enable larger numbers of communication devices within the range of the access point network to compute their position. This can also minimize bandwidth and power consumption at the communication device.

Referring to FIG. 1A, an example block diagram of a passive positioning scheme for determining the position of a client station is shown. The passive positioning scheme includes a wireless communication network 100 comprising three access points 102, 104, 106, and a client station 120. The access points 102, 104, 106 may be an advanced WLAN access points capable of determining their own positions (e.g., a self-locating access point). Each of the access points can select one or more other access points in the wireless communication network 100 (e.g., within the communication range of one another). In some implementations, access points can be arranged that one access point can be designated as a master access point, and the other access points can be designated as target access points. The client station 120 can be any suitable electronic device (e.g., a notebook computer, a tablet computer, a netbook, a mobile phone, a gaming console, a personal digital assistant (PDA), inventory tag, etc.) with WLAN communication capabilities. Furthermore, in FIG. 1A, the client station 120 is within the communication range of one or more access points 102, 104, 106.

In an embodiment, the access point 102 transmits a periodic fine timing or QoSNull message (M) to one or more of the other access points 104, 106. The message M can comprise an identifier associated with the first access point (e.g., a network address of the access point 102), an identifier associated with a second access point (e.g., a network address of the access point 104), a sequence number that identifies the fine timing or QoSNull message, and a timestamp indicating the time instant at which the message M was transmitted. The second access point 104 can determine RTT information (e.g., RTT/2) as the time difference between the time instant at which the message M was transmitted and received. The access point 102 receives a fine timing or QoSNull acknowledgment message (ACK) from one or more access points 104, 106 and determines RTT timing information associated with each of the access points 104, 106. In response to receiving the message M, the second access point (e.g., the access point 104 in this example) can generate and transmit a corresponding acknowledgment ACK response message. In one implementation, the ACK message indicates receipt of the message M at the access point 104. The ACK message can comprise the identifier associated with the first access point 102, the identifier associated with the second access point 104, and the sequence number that identifies the corresponding fine timing or QoSNull request message, and a timestamp indicating the time instant at which the ACK message was transmitted.

The first access point 102 can receive the ACK response message from the second access point 104, determine the time instant at which the ACK message was received, and determine the RTT timing information associated with the second access point 104. The first access point 102 can determine the RTT timing information associated with the second access point 104 as the time difference between the time instant at which the message M was transmitted and the time instant at which the ACK response message was received. In the example of FIG. 1, the first access point 102 can exchange fine timing or QoSNull message/ACK response messages 108 with the second access point 104, and also can exchange fine timing or QoSNull message/ACK response messages 110 with another access point 106. The second access point 104 also can exchange fine timing or QoSNull message/ACK response messages 112 with another access point 106. Each of the access points 102, 104, 106 can determine the RTT timing information associated with the other access points in a network.

The client station 120 can intercept the M messages and the ACK response messages to determine TDOA timing information associated with the access points 102, 104, 106. The dashed lines 114, 116, 118 represent the client station 120 intercepting the QoSNull message/ACK response messages 108, 110, 112 exchanged between the access points 102, 104, 106 (e.g, the AP cluster). The client station 120 can measure the arrival time difference between the M messages and the corresponding ACK response messages. For example, the client station 120 can determine a first time instant at which the message M (transmitted by the first access point 102 to the second access point 104) was detected. The client station 120 can also determine a second time instant at which the ACK message (transmitted by the second access point 104 to the first access point 102) was detected. The client station 120 can subtract the first time instant from the second time instant to determine the TDOA timing information associated with the first and second access points 102, 104.

In an embodiment, the access points 102, 104, 106 can transmit an RTT measurement control message comprising an indication of the RTT timing information and AP position information. In one implementation, each of the access points 102, 104, 106 can broadcast a distinct RTT measurement control message for neighboring access points to indicate the RTT timing information associated with the neighboring access points. In addition to the RTT timing information associated with the access points, the RTT measurement control message can also comprise the AP position information. The AP position information can include an indication of the position of the broadcasting access point and an indication of the position of the neighboring access points. The client station 120 can receive the RTT measurement control message(s) and can store the AP position information, the TDOA timing information, and the RTT timing information associated with the access points 102, 104, 106, in a predetermined memory location, a data structure, or another suitable storage device.

The client station 120 is configured to determine a position, at least in part, on the AP position information, the TDOA timing information, and the RTT timing information associated with the access points. In some implementations, as will be further described, the client station 120 can use the AP position information, the TDOA timing information, and the RTT timing information to construct a "positioning equation" in terms of the range between the client station 120 and each of the predetermined number of access points. For example, on determining that AP position information, the TDOA timing information, and the RTT timing information associated with three target access points are available, the client station 120 can solve three positioning equations to determine a three-dimensional position of the client station 120. It is noted that in other implementations, the client station 120 can determine a position based on the AP position information, the TDOA timing information, and the RTT timing information associated with any suitable number of access points. For example, a position can be based on two independent positioning equations from the AP position information, the TDOA timing information, and the RTT timing information associated with two target access points to determine a two-dimensional position of the client station 120.

In an embodiment, the access points 102, 104, 106 do not transmit RTT measurement information to the client station 120. The RTT timing information can be used to change/modify the SIFS time in an AP by an amount that is proportional to the distance between two AP stations. The client station 120 is configured to determine a position without knowledge of the RTT measurement information. That is, the position calculations are based on the AP position information, the TDOA timing information, and the SIFS information associated with the access points 102, 104, 106. The AP position information and the SIFS information can be included in a periodic broadcast message and stored in a predetermined memory location, a data structure, or another suitable storage device on the client station 120.

Figure 1B:
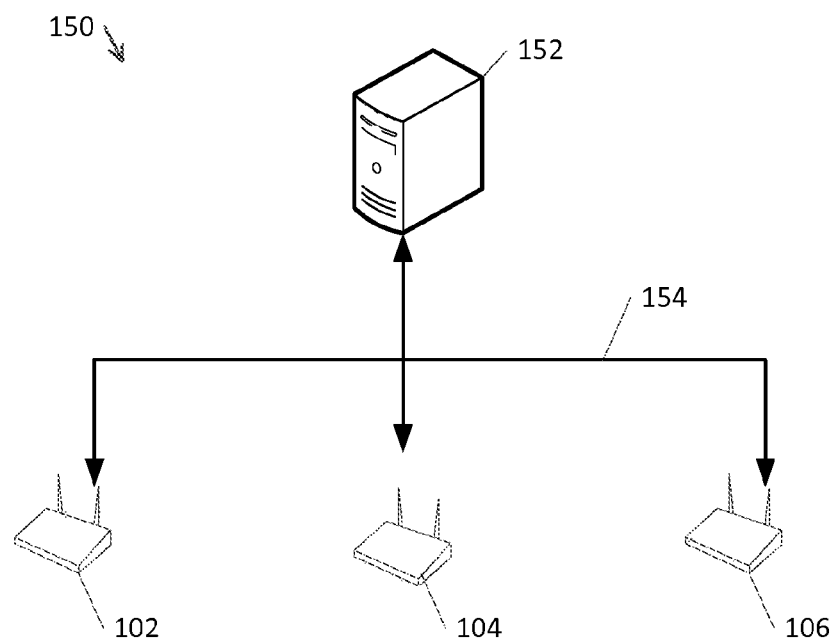
FIG. 1B is an example network diagram of a wireless local area network including a position server.

Referring to FIG. 1B, an example network diagram of a wireless local area network including a position server is shown. The network 150 includes access points 102, 104, 106, a position server 152, and a communication path 154. The position server 152 is a computing device including a processor and a memory and is configured to execute computer executable instructions. For example, a position server 152 comprises a computer system including a processor, non-transitory memory, disk drives, a display, a keyboard, a mouse. The processor is preferably an intelligent device, e.g., a personal computer central processing unit (CPU) such as those made by Intel® Corporation or AMD®, a microcontroller, an application specific integrated circuit (ASIC), etc. The memory includes random access memory (RAM) and read-only memory (ROM). The disk drives include a hard-disk drive, a CD-ROM drive, and/or a zip drive, and may include other forms of drives. The display is a liquid-crystal display (LCD) (e.g., a thin-film transistor (TFT) display), although other forms of displays are acceptable, e.g., a cathode-ray tube (CRT). The keyboard and mouse provide data input mechanisms for a user. The position server 152 stores (e.g., in the memory) processor-readable, processor-executable software code containing instructions for controlling the processor to perform functions described herein. The functions assist in the implementation of a passive positioning scheme. The software can be loaded onto the memory by being downloaded via a network connection, uploaded from a disk, etc. Further, the software may not be directly executable, e.g., requiring compiling before execution. The access points 102, 104, 106 are configured to communicate with the position server 152 to exchange position information via the communication path 154. The communication path 154 can be a wide area network (WAN) and can include the internet. The position server 152 can include a data structure (e.g., relational database, flat files) to store AP location information. For example, the position server 152 can include AP position information (e.g., lat./long., x/y), RTT information, SIFS information, and other information associated with an access point (e.g., SSID, MAC address, uncertainty value, coverage area, etc.). An access point 102, 104, 106 can communicate with the position server 152 106 and can retrieve AP location information, SIFS information and RTT information for use in client station positioning solutions. The configuration of the position server 152 is exemplary only, and not a limitation. In an embodiment, the position server 152 may be connected directly to an access point. More than one position servers may be used. The position server 152 can include one or more databases containing position information associated with other access points on additional networks. In an example, the position server 152 is comprised of multiple server units.

Figure 2:
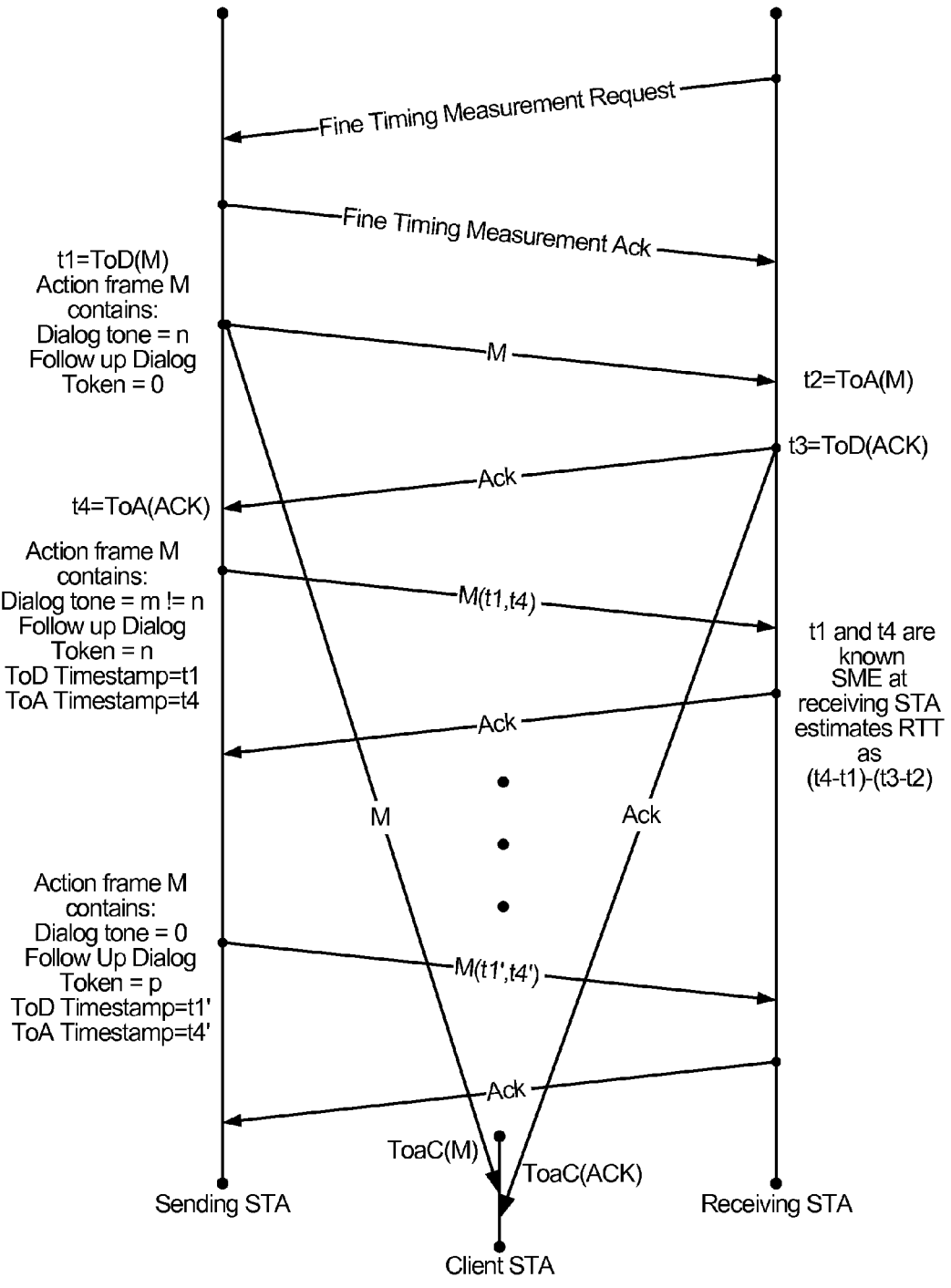
FIG. 2 is a prior art example of a conceptual diagram of a fine timing measurement request.

Referring to FIG. 2, a prior art example of a conceptual diagram of a fine timing measurement request is shown. The general approach includes a receiving station and a sending station. The receiving station can send a fine timing measurement request to the sending station and receive a corresponding acknowledgment message. The sending station then transmits an action frame M at time t1. The action frame M is received by the receiving station at time t2, and an acknowledgment message ACK is transmitted by the receiving station at time t3. The client station can detect time of departure (ToD) of the message at time t1, and the ToD of the ACK at time t3. The ACK message is received by the sending station at time t4. The sending station then prepares a subsequent message which includes the values for t1 and t4. The receiving station then estimates the RTT as (t4−t1)−(t3−t2). The RTT information is then provided to a client station. The prior art approach requires multiple round-trip messages to determine t4, and subsequently compute an RTT value. As a result, in an environment with many client stations and a corresponding number of measurement requests, the multiple round trip messages can have a significant impact on the bandwidth available to the access points and the client stations. As will be discussed below, an advantage of a passive positioning scheme is to reduce the number of messages being transmitted between the access points.

Figure 3A:
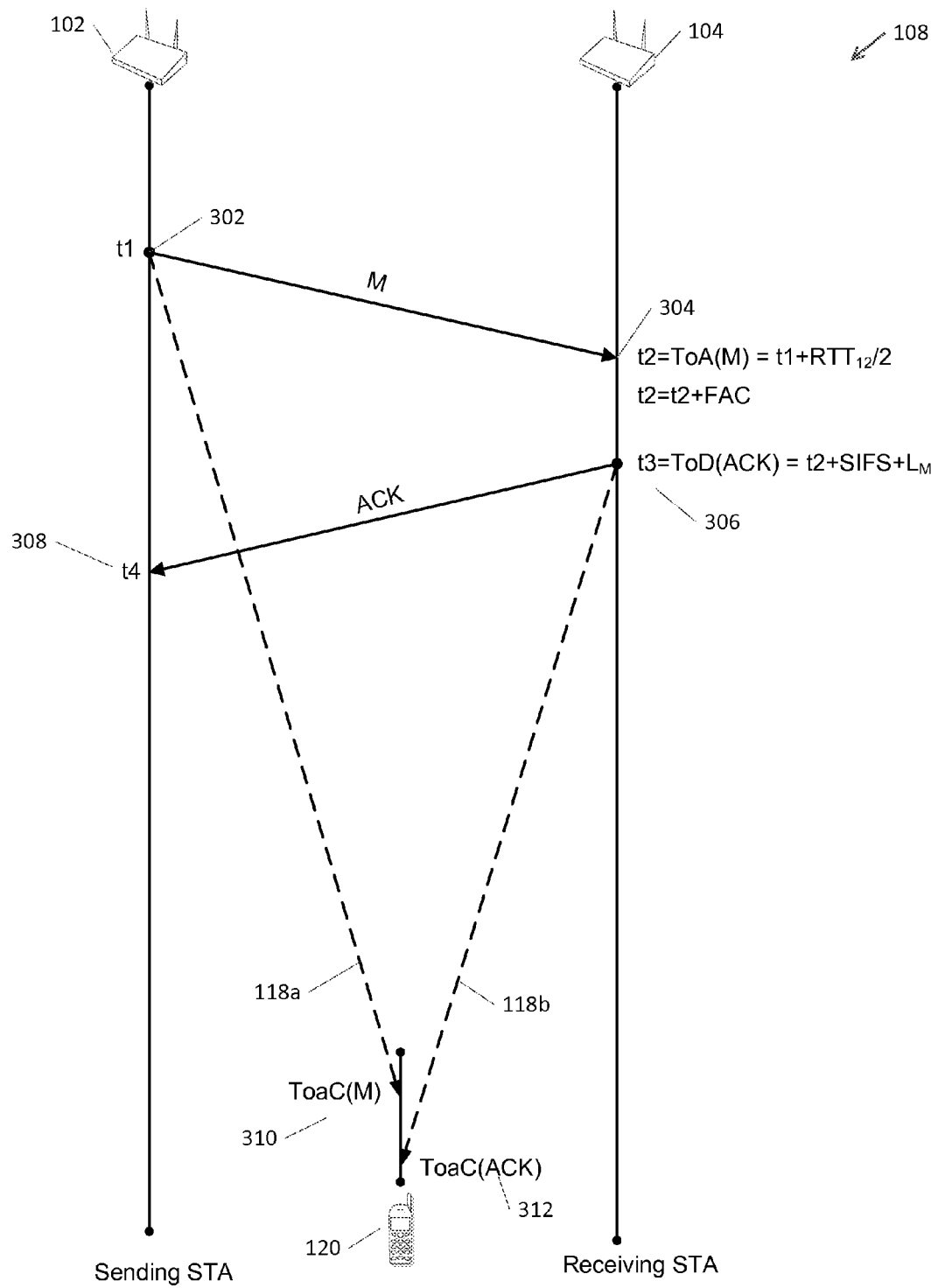
FIG. 3A is an example of a conceptual diagram of a passive positioning scheme based on a FAC estimate.

Referring to FIG. 3A, with further reference to FIG. 1A, an example of a conceptual diagram of a passive positioning scheme based on a FAC estimate is shown. The diagram includes the messages included, for example, in the QoSNull message/ACK response messages 108 between a first access point 102 and a second access point 104. In this example, the first access point 102 (AP1) is the sending station and the second access point 104 (AP2) is the receiving station. The dashed lines 118a, 118b represent the client station 120 intercepting M/ACK messages respectively. The access points 102, 104 engage in fine timing or QoSNull exchanges (for example) on a periodic basis. The access points 102, 104 can broadcast their location information. At time t1 302, a time message M leaves AP1. The message M has a message length of $L_M$. At time t4 308 an ACK message from AP2 arrives at AP1. The time the message M from AP1 reaches the client station 120 is denoted as the Time of arrival at Client (i.e., ToaC(M) 310). The time the ACK messages from AP2 reaches the client station 120 is denoted as the Time of arrival at Client (i.e., ToaC(ACK) 312). A position equation can be based on the Time of Flight (ToF) between AP1 and the client station 120, and the ToF between AP2 and the client station 120. For example, using 'c' as the speed of light, the differential distance can be expressed as:

$$\text{Diff\_dist\_12} = c*[\text{ToaC}(M) - t1 - (\text{ToaC(ACK)} - t3]$$

Figure 3B:
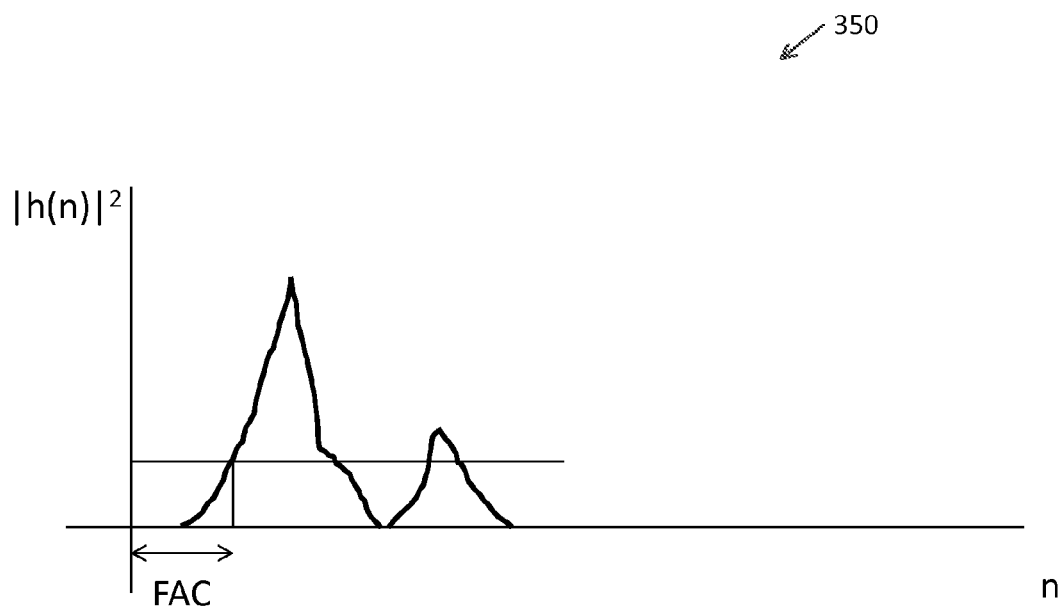
FIG. 3B is a graphical example of a FAC estimate.

The $RTT_{12}/2$ is the time of flight between AP1 and AP2. The value for $RTT_{12}/2$ can be determined based on the time instance of t1 and t2, or may be established based on the locations of AP1 and AP2. In an embodiment, AP2 is configured to adjust the value of t2 (i.e., the ToA of M) for the first arrival of the channel. Referring to the graph 350 in FIG. 3B, the value of the FAC can be based on the received signals. As an example, and not a limitation, the FAC algorithm may use leading edge samples and statistical information. The FAC algorithm may determine a maximum for the value for h(n) and then set the value to "1." A variable threshold value can then be applied and the resulting FAC can be used to adjust t2 304:

$$t2 = t2 + \text{FAC}$$

The value of t2 may be adjusted based on the FAC value. AP2 can be configured to send the ACK message at time t3 306, where:

$$t3 = t2 + \text{SIFS} + L_M$$

The value of SIFS is known through previous broadcast messages or established network standards. The particular value of SIFS can be any constant that is within reason of a standard value. The value of message length $L_M$ (i.e., a length of an incoming packet or message) can be determined when the message M is received by AP2. Substituting for t2, the equation can be derived as follows:

$$t2 = t1 + RTT_{12}/2$$

$$t3 = t1 + RTT_{12}/2 + \text{SIFS} + L_M$$

$$\text{Diff\_dist\_12} = c*[\text{ToaC}(M) - (\text{ToaC(ACK)} - (RTT_{12}/2 + \text{SIFS} + L_M))]$$

This method of determining a location of the client station 120 does not require the additional overhead packets used in the prior art method described in FIG. 2. The client station 120 can receive the $RTT_{12}$ data in the form of a previous broadcast message, or via a previous download from the position server 152.

Figure 4:
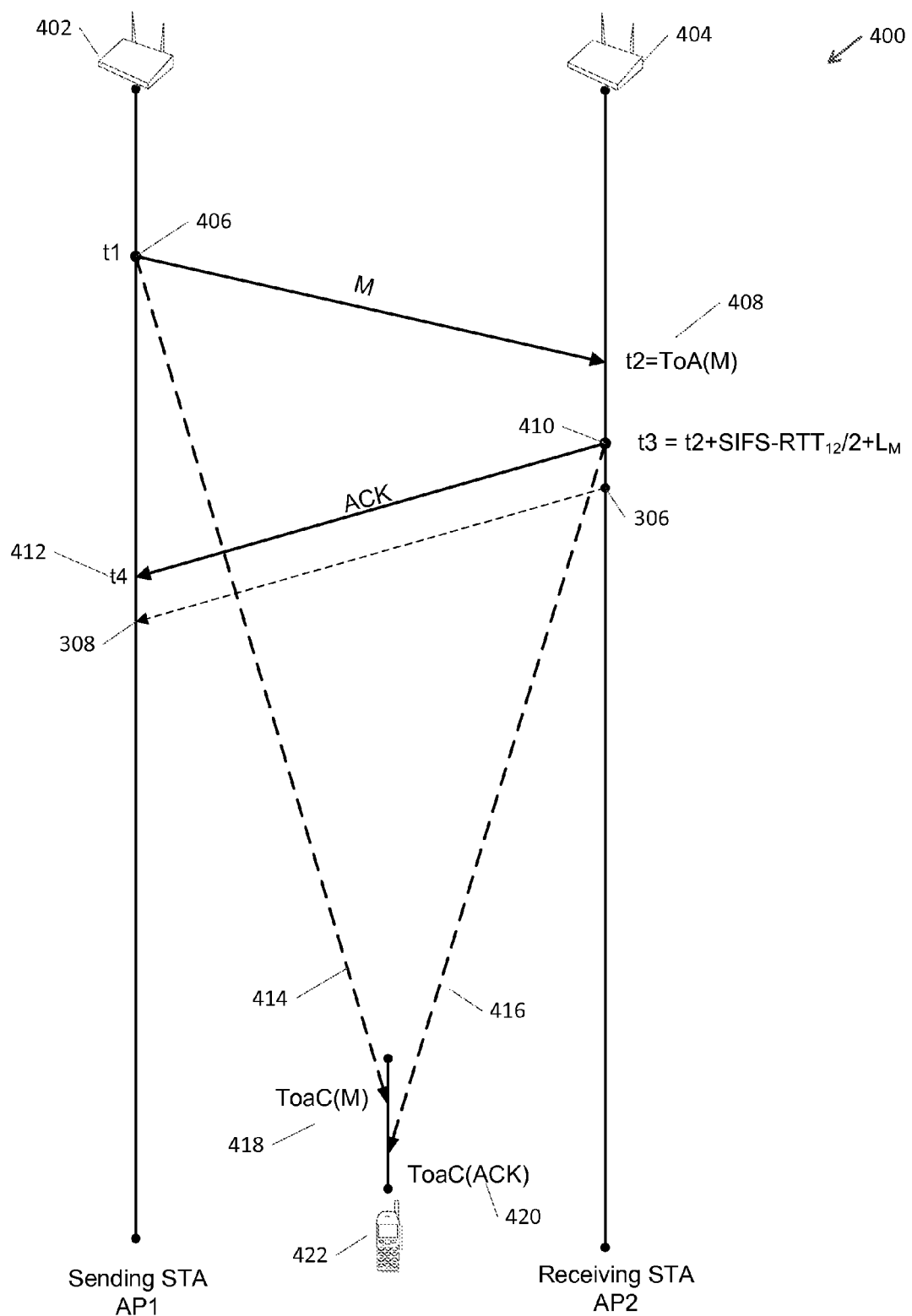
FIG. 4 is an example of a conceptual diagram of a passive positioning scheme based on a dynamic SIFS time.

Referring to FIG. 4, with further reference to FIG. 3A, an example of a conceptual diagram of a passive positioning scheme based on a dynamic SIFS time 400 is shown. In this example, access points engage in fine timing or QoSNull exchanges on a periodic basis and change their SIFS time band an amount proportional to the distance to the AP they are doing an exchange with. The APs do not need to broadcast RTT information, and need not broadcast their location if the AP position information is made available on the client station 120. In an example, a sending station 402 (i.e., AP1) transmits a message M at time t1 406. A receiving station 404 (i.e., AP2) receives the message M at time t2 408. In an embodiment, the time t2 can be adjusted by the FAC as previously described. An ACK message is transmitted at time t3 410 and received at time t4 412. In contrast to the embodiment depicted in FIG. 3A, and shown as a dashed line between points 306 and 308, the time t3 is reduced by $RTT_{12}/2$ which is an amount that is proportional to the distance between AP1 and AP2. The receiving station 404 (i.e., AP2) delivers the ACK at time t3, where:

$$t3 = t2 + \text{SIFS} - RTT_{12}/2 + L_M$$

The differences between t3 points 410 in FIGS. 4, and t3 point 306 in FIG. 3A (and also shown on FIG. 4) is exemplary only and not necessarily to proportion. The t3 points 410, 306 illustrate that the receiving station 404 is configured to send the ACK message at a time that is earlier than the previous embodiment. As described above, the QoSNull message M and the ACK message are intercepted 414, 416 by the client station 422. The ToaC(M) 418 is the time the message M from AP1 reaches the client station 422, and the ToaC(ACK) 420 is the time the ACK from AP2 reaches the client station 422. Solving for differential distance:

$$\text{Diff\_dist\_12} = c*[\text{ToaC}(M) - t1 - (\text{ToaC(ACK)} - t3]$$

$$t2 = t1 + RTT_{12}/2$$

$$t3 = t1 + RTT_{12}/2 + \text{SIFS} + L_M - RTT_{12}/2$$

$$\text{Diff\_dist\_12} = c*[\text{ToaC}(M) - (\text{ToaC(ACK)} - (\text{SIFS} + L_M))]$$

This approach requires neither the overhead of addition packets in the air, nor the assistance data (i.e., RTT data) at the client station. In an embodiment, the client station is a low priced tag (e.g., RFID tag) that relies solely on network based positioning.

Figure 5A:
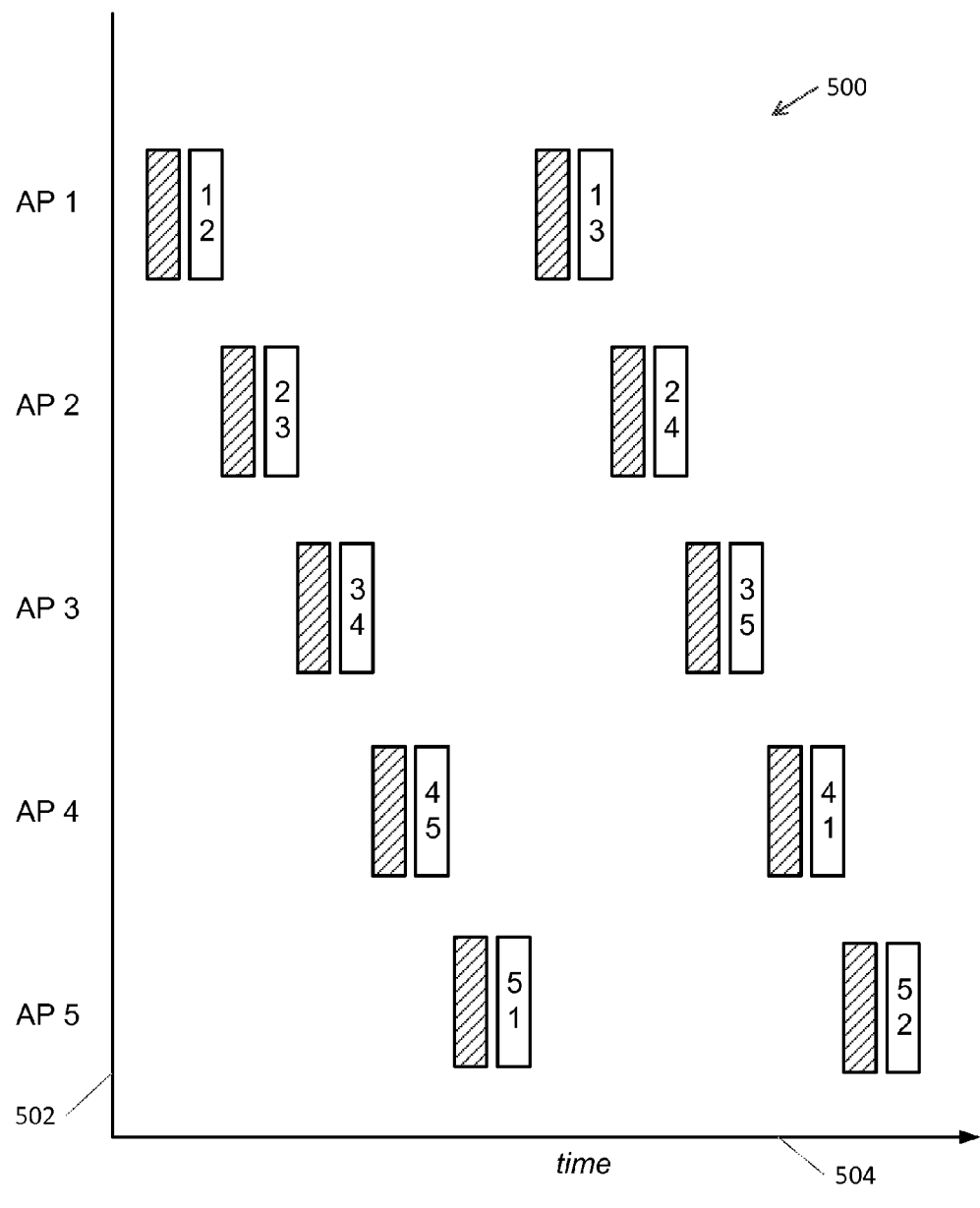
FIGS. 5A and 5B are exemplary access point broadcast and message exchange timing diagrams.

Referring to FIG. 5A, an example access point broadcast and message exchange timing diagram 500 is shown. The access point broadcast and message exchange timing diagram 500 includes a y-axis 502 with a list of the access points (e.g., AP1, AP2, AP3, AP4, AP5) in a cluster, an x-axis 504 to indicate the progression of time, indications of time slots for beacon transmissions 506 for each of the access points, and indications of time slots for message exchanges 508 for each of the access points. The message exchanges 508 include a general indication of a time slot, and an indication of the access points that are participating in the exchange (e.g., 1-2, 2-3, 3-4, etc. . . . ). The message exchanges can be a fine timing exchange or a QoSNull exchange. In an embodiment, the beacon transmissions can include AP position information and RTT information. A client station 120 can passively listen for beacon transmissions 506 and then receive the message exchanges 508 (e.g., fine timing or QoSNull messages) including a message M and the corresponding ACK message. As depicted in the access point broadcast and message exchange timing diagram 500, AP1 can be configured to broadcast a beacon message at a first time, and then initiate an exchange message with AP2 at a second time. AP2 can be configured to then broadcast a beacon message and then initiate an exchange message with AP3. The sequence can continue as depicted in the diagram such that each AP has an opportunity to execute a message exchange with the other access points in a cluster.

Figure 5B:
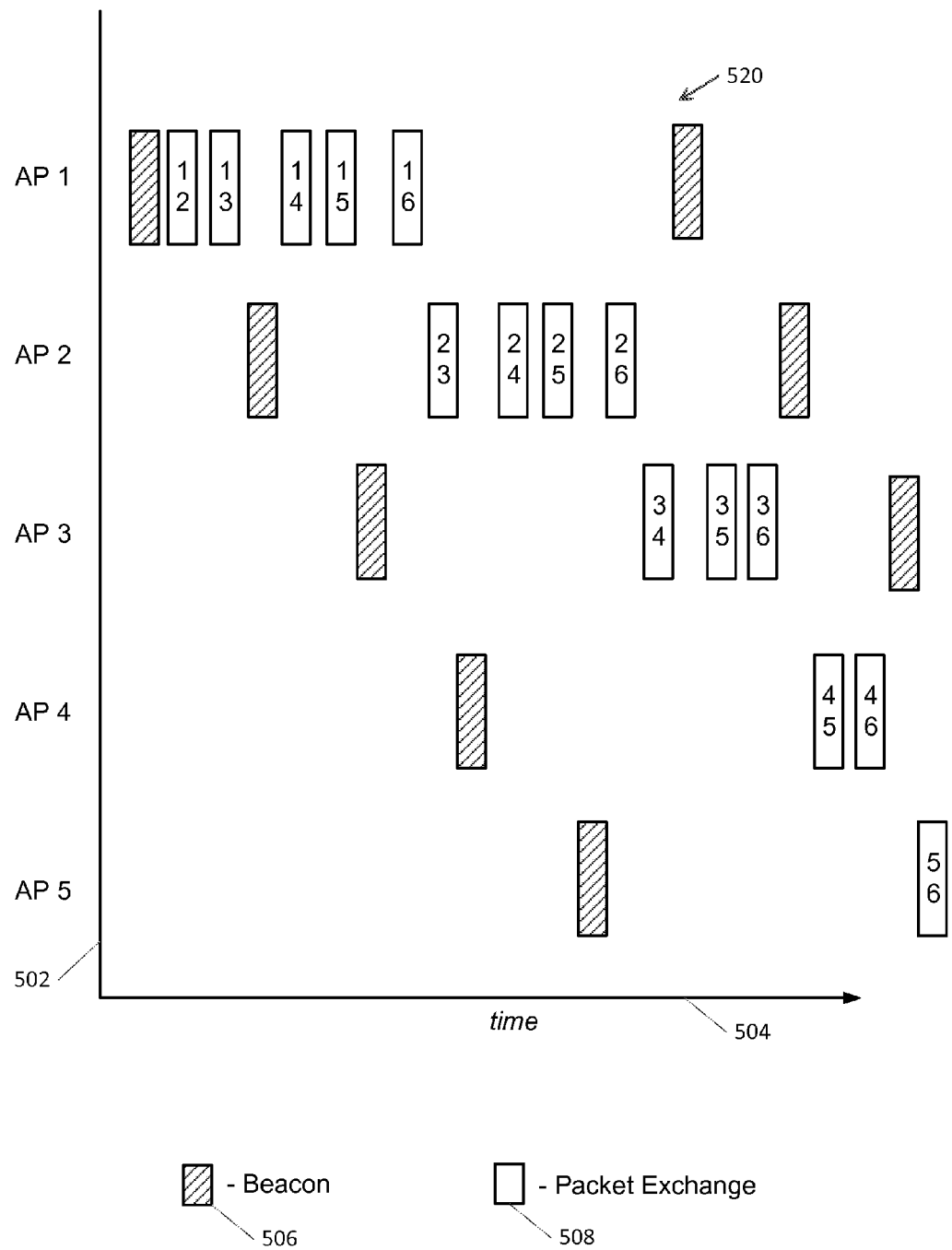

The timing and sequence of the beacon transmissions 506 and the message exchanges 508 in the access point broadcast and message exchange timing diagram 500 are exemplary only and not limiting. For example, referring to FIG. 5B, the timing diagram 520 illustrates that a first AP may broadcast a beacon message and then sequentially initiate message exchanges with more than one of the other APs in the cluster. Neighboring APs may then initiate message exchanges with one or more APs in the cluster. Other sequences may also be used. In an example, the beacon transmissions 506 can occur every 100 ms, and each AP can execute a fine timing or QoSNull exchange with the 10 nearest neighboring APs every second (i.e., a complete update every second). If there are only 5 neighboring APs, then the APs can be configured to update twice a second or execute a fine timing exchange every other beacon and update every second. In an example including only 2 neighboring APs, then the APs can be configured to update five times a second, or execute a fine timing exchange every $5^{th}$ beacon and update every second. Other beacon transmission and message exchange scenarios may be used based on the size of the network (e.g., cluster), technical capabilities of the network hardware and software, or other performance criteria.

Figure 6:
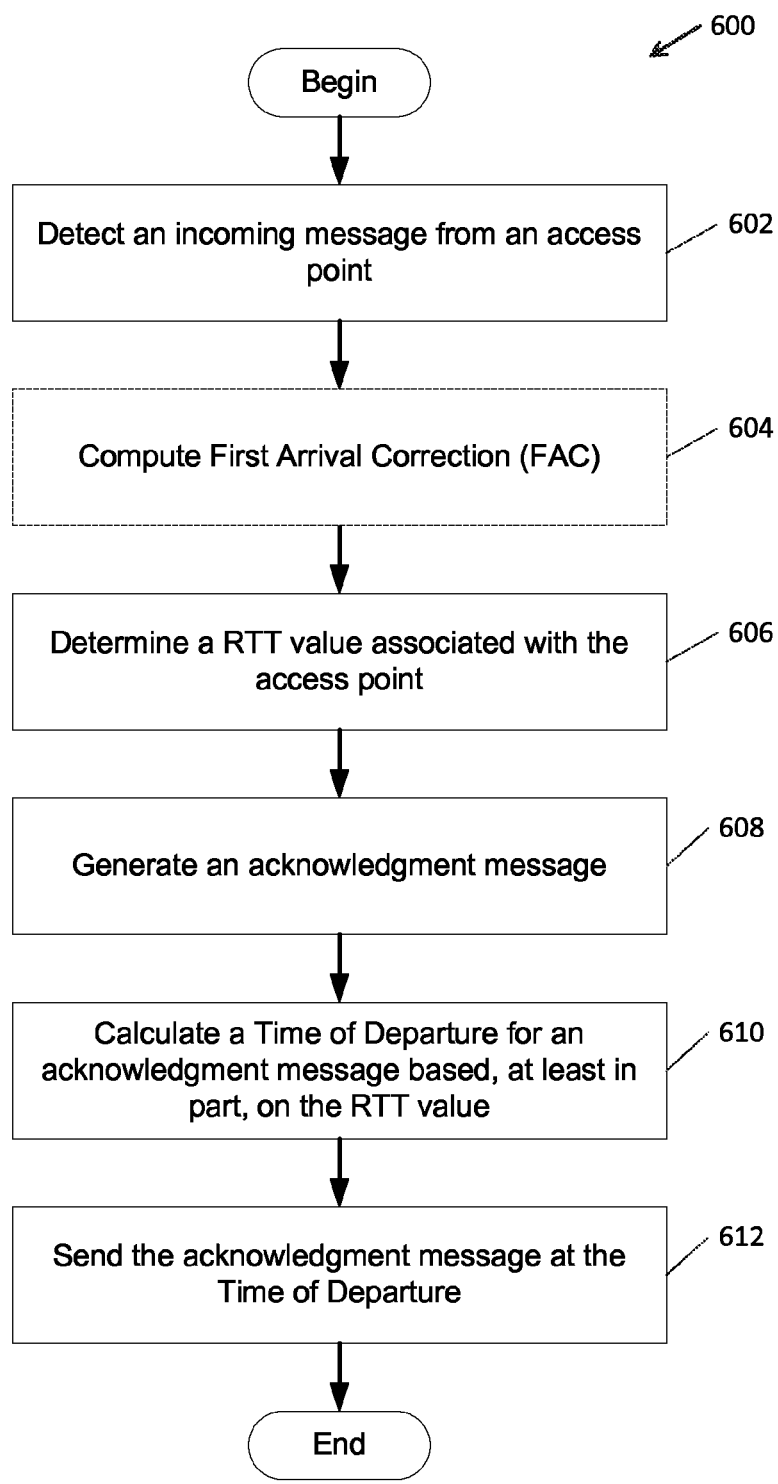
FIG. 6 is flow diagram of a process for sending an acknowledgment message based on an RTT value.

In operation, referring to FIG. 6, with further reference to FIGS. 1A-4, a process 600 for sending an acknowledgment based on an RTT value using the wireless communication network 100 includes the stages shown. The process 600, however, is exemplary only and not limiting. The process 600 may be altered, e.g., by having stages added, removed, or rearranged. For example, determining a First Arrival Correction (FAC) at stage 604 is optional an need not be included in the process 600.

At stage 602, a receiving station (e.g., the second access point 104 (AP2)) is configured to detect an incoming message from a neighboring sending station (e.g., a first access point 102 (AP1)). The access points can be advanced WLAN access points including at least one processor and memory. The incoming message can be a packet exchange such as a fine timing message or a QoSNull message and can include a time stamp indicating the time the message was transmitted from the sending station.

At stage 604, the receiving station can determine the time of arrival of the incoming message. In an embodiment, due to the impact of multi-channel effects in wireless communications, the time of arrival may need to be corrected. The receiving access point can be configured to execute an optional First Arrival Correction (FAC) algorithm on the incoming message and determine a time of arrival.

At stage 606, the receiving station (e.g., the second access point 104 (AP2)) can determine an RTT value that is associated with the sending station (e.g., AP1). In an embodiment, the RTT value can be determined based on the time the message was transmitted (e.g., the time stamp). The RTT value (i.e., information) can be determined based on previous fine timing message exchanges. For example, the receiving station may store the previous RTT information in local memory, and may have access to a database on the position server 152. In an example, the RTT information can be included in beacon transmissions 506, or can be based on the relative positions of the sending and receiving stations. At stage 608, the receiving station generates an acknowledgment message (ACK) in response to the incoming message detected at stage 602.

At stage 610, the receiving station can be configured to calculate a time of departure for an acknowledgment message to the incoming message based on the RTT value. For example, the wireless communication network 100 may have an established SIFS value for each participating station (e.g., 102, 104, 106). An exemplary SIFS value may be 16 microseconds (or other value set by a networking standard). The receiving station can reduce the SIFS value by an amount proportional to the distance to the sending station. For example, the SIFS value can be reduced by half of the RTT value (e.g., RTT/2). At stage 612, referring to FIG. 4, the receiving station can be configured to send the acknowledgment message at time of departure (e.g., time t3 410). The acknowledgment message can include a time stamp indicating the time of departure.

Figure 7:
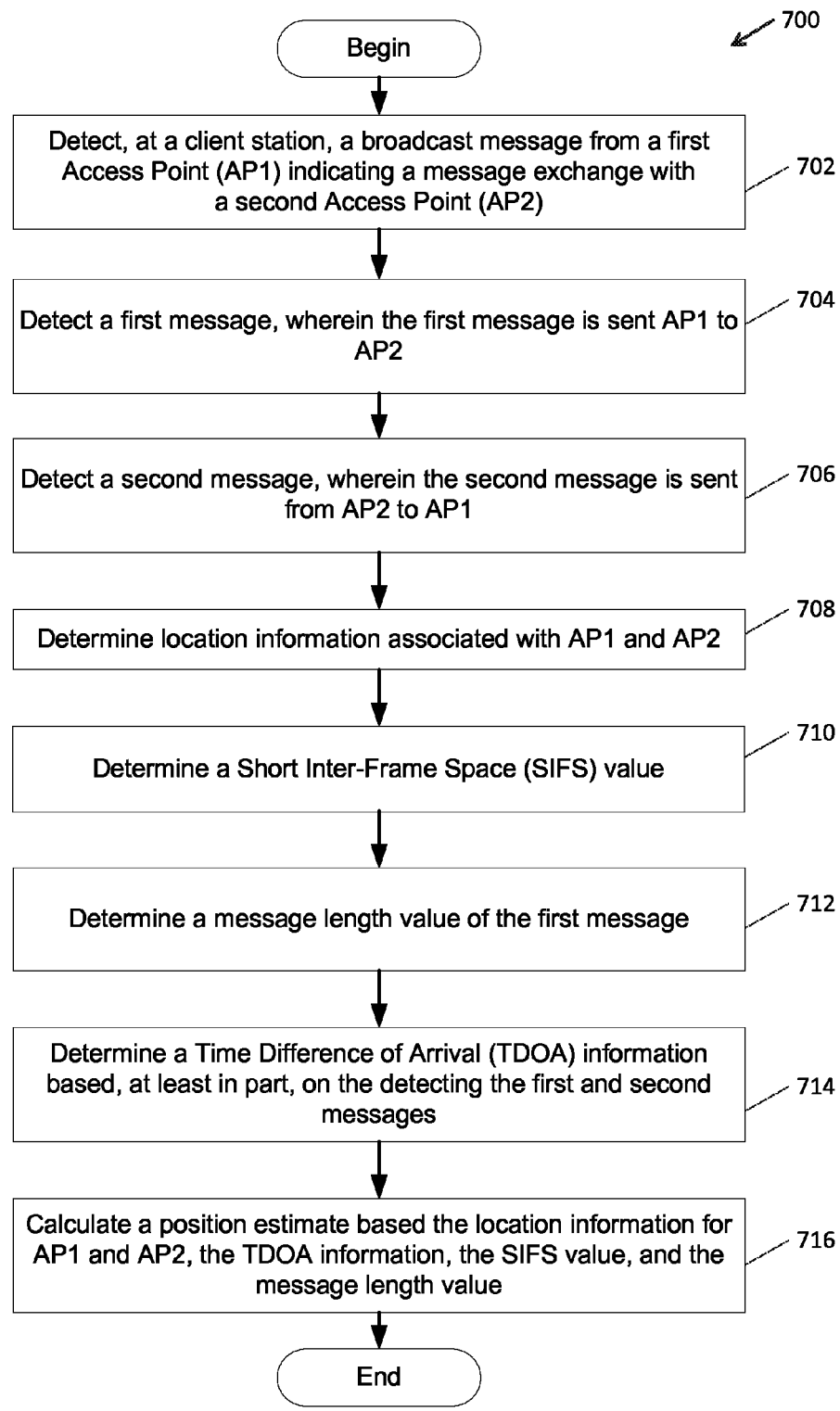
FIG. 7 is flow diagram of a process for calculating the position of client station.

In operation, referring to FIG. 7, with further reference to FIGS. 1A-5B, a process 700 for calculating the position of a client station 422 using the wireless communication network 100 includes the stages shown. The process 700, however, is exemplary only and not limiting. The process 600 may be altered, e.g., by having stages added, removed, or rearranged. For example, a position calculation can be made by the processors on the client station 422 (i.e., local), or by the processors in the position server 152 (i.e., remote).

At stage 702, the client station 422 can detect a broadcast message from a first AP (AP1) indicating a message exchange with a second AP (AP2). In an example the broadcast message can be beacon transmissions 506 transmitted from AP1. The broadcast message can include an indication of subsequent message exchanges. In an embodiment, the broadcast message does not include RTT information or AP location information. At stage 704, the client station 422 can be configured to detect (e.g., intercept 414) a first message sent from AP1 to AP2. For example, the first message can be a fine time request or a QoSNull message (e.g., message M). The first message will have message length denoted at $L_M$. The client station 422 can determine and store a time instant for the time of arrival of the first message (e.g., ToaC(M) 418).

At stage 706, the client station 422 can be configured to detect (e.g., intercept 416) a subsequent message sent from the second AP (AP2) to the first AP (AP1). For example, the client station 422 can detect the ACK message transmitted from the receiving station 404 at time t3 410. The client station 422 can be configured to determine and store a time instant for the time of arrival for the ACK message (e.g., ToaC(ACK) 420). The ACK message may include a time stamp indicating the time of transmission (e.g., time t3 404).

At stage 708, the client station 422 can determine location information associated with AP1 and AP2. This information can be previously stored on the client station 422. For example, the location of stations in a network can be downloaded from a position server 152. At stage 710, the client station 422 determines a Short Inter-Frame Space (SIFS) value. In an example, the SIFS value can be a previously established constant for a network. Other mechanisms for providing a client station 422 with location and SIFS data may include push notifications, location based services, synchronization may be used. At stage 712, the client station 422 can determine the value for $L_M$ based on the message intercepted at stage 704. The client station 422 can be configured to compute a position based on the time instances for the ToaC(M) and ToaC(ACK). At stage 714, the client station determines the time difference of arrival (TDOA) information as the time instances for the ToaC(M) and ToaC(ACK).

At stage 716, the client station 422 is configured to calculate a position estimate based on the location information for the first and second APs, the TDOA timing information, the SIFS value, and the message length value. In an embodiment, the processing power of the position server 152, or other network hardware (e.g., access point, library server) can be used to perform the calculations. A position estimate can be based on a differential distance formula expressed as:

$$\text{Diff\_dist\_12} = c^*[\text{ToaC}(M) - (\text{ToaC}(\text{ACK}) - (\text{SIFS} + L_M))]$$

Where 'c' is the speed of light, SIFS is the established system constant, and $L_M$ is the message length of the first message. The client station 422 can be configured to repeat the process 700 with addition APs to determine addition position estimates, and then combine the resulting position estimates to determine a position of the client station 422.

Embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments of the inventive subject matter may take the form of a computer program product embodied in any tangible medium of expression having computer usable program code embodied in the medium. The described embodiments may be provided as a computer program product, or software, that may include a machine-readable medium having stored thereon instructions, which may be used to program a computer system (or other electronic device(s)) to execute (e.g., perform) a process according to embodiments, whether presently described or not, since every conceivable variation is not enumerated herein. A machine-readable medium includes any mechanism for storing or transmitting information in a form (e.g., software, processing application) readable by a machine (e.g., a computer). A machine-readable medium may be a machine-readable storage medium, or a machine-readable signal medium. A machine-readable storage medium may include, for example, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of tangible medium suitable for storing electronic instructions. A machine-readable signal medium may include a propagated data signal with computer readable program code embodied therein, for example, an electrical, optical, acoustical, or other form of propagated signal (e.g., carrier waves, infrared signals, digital signals, etc.). Program code embodied on a machine-readable signal medium may be transmitted using any suitable medium, including, but not limited to, wireline, wireless, optical fiber cable, RF, or other communications medium.

Computer program code for carrying out operations of the embodiments may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a personal area network (PAN), or a wide area network (WAN), or the connection may be made to an external computer (for example, through the Internet using an Internet Service Provider).

Figure 8A:
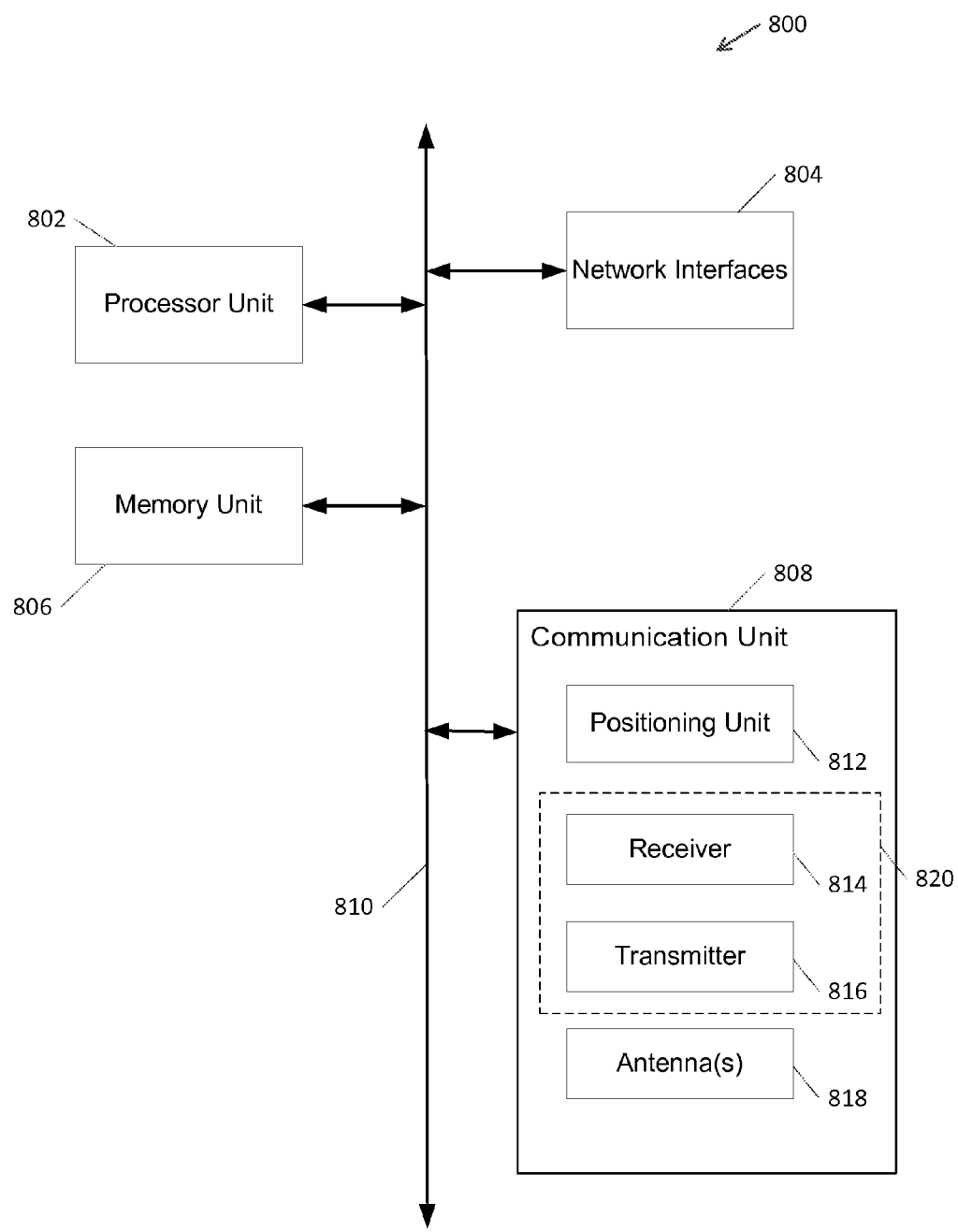
FIG. 8A is a block diagram of an exemplary client station.

Referring to FIG. 8A is a block diagram of one embodiment of an electronic device 800 for use in a passive positioning scheme. The client station 120 may be an electronic device 800. In some implementations, the electronic device 800 may be one of a notebook computer, a tablet computer, a netbook, a mobile phone, a gaming console, a personal digital assistant (PDA), an inventory tag, or other electronic systems comprising a WLAN device (e.g., Home Node B (HNB)) with positioning and wireless communication capabilities. The electronic device 800 includes a processor unit 802 (possibly including multiple processors, multiple cores, multiple nodes, and/or implementing multi-threading, etc.). The electronic device 800 includes a memory unit 806. The memory unit 806 may be system memory (e.g., one or more of cache, SRAM, DRAM, zero capacitor RAM, Twin Transistor RAM, eDRAM, EDO RAM, DDR RAM, EEPROM, NRAM, RRAIVI, SONOS, PRAM, etc.) or any one or more of the above already described possible realizations of machine-readable media. The electronic device 800 also includes a bus 810 (e.g., PCI, ISA, PCI-Express, HyperTransport®, InfiniBand®, NuBus, AHB, AXI, etc.), and network interfaces 804 that include at least one of a wireless network interface (e.g., a WLAN interface, a Bluetooth® interface, a WiMAX interface, a ZigBee® interface, a Wireless USB interface, etc.) and a wired network interface (e.g., an Ethernet interface, etc.).

The electronic device 800 also includes a communication unit 808. The communication unit 808 comprises a positioning unit 812, a receiver 814, a transmitter 816, and one or more antennas 818. The transmitter 816, the antennas 818, and the receiver 814 form a wireless communication module (with the transmitter 816 and the receiver 814 being a transceiver 820). The transmitter 816 and the receiver 814 are configured to communicate bi-directionally with one or more client stations and other access points via a corresponding antennas 818. In some embodiments, the electronic device 800 can be configured as a WLAN client station with positioning capabilities. The positioning unit 812 can detect the fine timing or QoSNull request/response messages exchanged between the access points to determine TDOA timing information associated with the access points. The positioning unit 812 can determine the position of the electronic device 800 based, at least in part, on the TDOA timing information, and the AP position information, as described above with reference to FIGS. 1-7. In some embodiments, the access points 102, 104, 106 can also be configured as the electronic device 800 of FIG. 8A. In this embodiment, the access points can use their processing capabilities to execute their respective operations described above. Any one of these functionalities may be partially (or entirely) implemented in hardware and/or on the processor unit 802. For example, the functionality may be implemented with an application specific integrated circuit, in logic implemented in the processor unit 802, in a coprocessor on a peripheral device or card, etc. Further, realizations may include fewer or additional components not illustrated in FIG. 8A (e.g., video cards, audio cards, additional network interfaces, peripheral devices, etc.). The processor unit 802, the memory unit 806, and the network interfaces 804 are coupled to the bus 810. Although illustrated as being coupled to the bus 810, the memory unit 806 may be coupled to the processor unit 802.

Figure 8B:
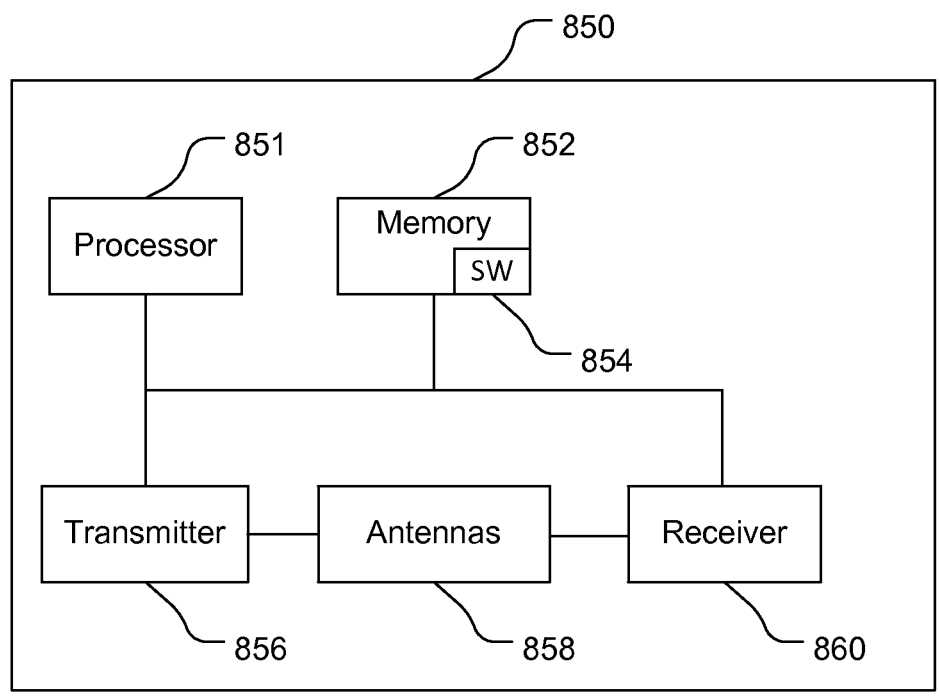
FIG. 8B is a block diagram of an exemplary access point.

Referring to FIG. 8B, an example of an Access Point (AP) 850 comprises a computer system including a processor 851, memory 852 including software 854, a transmitter 856, antennas 858, and a receiver 860. In some embodiments, the access points 102, 104, 106 can also be configured as the AP 850 of FIG. 8B. The transmitter 856, antennas 858, and the receiver 860 form a wireless communication module (with the transmitter 856 and the receiver 860 being a transceiver). The transmitter 856 is connected to one of the antennas 858 and the receiver 860 is connected to another of the antennas 858. Other example APs may have different configurations, e.g., with only one antenna 858, and/or with multiple transmitters 856 and/or multiple receivers 860. The transmitter 856 and the receiver 860 are configured such that the AP 850 can communicate bi-directionally with the client station 120 via the antennas 858. The processor 851 is preferably an intelligent hardware device, e.g., a central processing unit (CPU) such as those made by ARM®, Intel® Corporation, or AMD®, a microcontroller, an application specific integrated circuit (ASIC), etc. The processor 851 could comprise multiple separate physical entities that can be distributed in the AP 850. The memory 852 includes random access memory (RAM) and read-only memory (ROM). The memory 852 is a processor-readable storage medium that stores the software 854 which is processor-readable, processor-executable software code containing processor-readable instructions that are configured to, when executed, cause the processor 851 to perform various functions described herein (although the description may refer only to the processor 851 performing the functions). Alternatively, the software 854 may not be directly executable by the processor 851 but configured to cause the processor 851, e.g., when compiled and executed, to perform the functions.

While the embodiments are described with reference to various implementations and exploitations, it will be understood that these embodiments are illustrative and that the scope of the inventive subject matter is not limited to them. In general, techniques for a passive positioning scheme for wireless communication devices as described herein may be implemented with facilities consistent with any hardware system or hardware systems. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

As used herein, including in the claims, unless otherwise stated, a statement that a function or operation is "based on" an item or condition means that the function or operation is based on the stated item or condition and may be based on one or more items and/or conditions in addition to the stated item or condition.

Further, more than one invention may be disclosed.

The invention claimed is:

1. A method for exchanging positioning messages between access points, including:
   detecting, with a transceiver, an incoming message from an access point;
   determining a Round Trip Time (RTT) value associated with the access point;
   generating an acknowledgment message;
   calculating a time of departure for the acknowledgment message based, at least in part, on the RTT value; and
   sending, with the transceiver, the acknowledgment message at the time of departure.

2. The method of claim 1 further comprising computing a First Arrival Correction (FAC) for the incoming message.

3. The method of claim 2 wherein the time of departure for the acknowledgment message is based at least in part on the FAC.

4. The method of claim 1 further comprising determining a Short Inter-Frame Space (SIFS) value; and wherein calculating the time of departure is based on the RTT value and the SIFS value.

5. The method of claim 4 wherein calculating the time of departure for the acknowledgment message is performed according to:

$$t3 = t2 + \text{SIFS} - \text{RTT}/2 + L_M$$

wherein,
   t3 is the time of departure;
   t2 is a time the in coming message is detected;
   SIFS is the Short Inter-Frame Space value associated with the access point;
   RTT/2 is a time difference between a time instance when the incoming message was sent and a time instance when the incoming message is detected; and
   $L_M$ is a length of the incoming message.

6. The method of claim 1 further comprising determining a message length of the incoming message.

7. The method of claim 1 wherein the incoming message is a QoSNull message.

8. A method of positioning on a client station utilizing inter-access point messaging, comprising:
   detecting, at a client station, a broadcast message from a first access point indicating a message exchange with a second access point;
   detecting a first message, wherein the first message is sent from the first access point to the second access point;
   detecting a second message, wherein the second message is sent from the second access point to the first access point;
   determining location information associated with the first access point and the second access point;
   determining a Short Inter-Frame Space (SIFS) value;
   determining a message length value for the first message;
   determining time difference of arrival (TDOA) information based, at least in part, on the detecting of the first message and the second message; and
   calculating a position estimate based on the location information associated with the first access point and the second access point, the TDOA information, the SIFS value, and the message length value.

9. The method of claim 8 wherein the first message is a fine timing message.

10. The method of claim 8 wherein the first message is a QoSNull message.

11. The method of claim 8 wherein the broadcast message includes the location information associated with the first access point and the second access point.

12. The method of claim 8 wherein the broadcast message includes Round Trip Time (RTT) information associated with the first access point and the second access point.

13. The method of claim 8 wherein the broadcast message includes the SIFS value.

14. A system to exchange messages for use in passive positioning of a mobile unit, comprising:
   a memory unit;
   a transceiver;
   at least one processor coupled to the memory unit and the transceiver, and configured to:
     detect, with the transceiver, an incoming message from an access point;
     determine a Round Trip Time (RTT) value associated with the access point;
     generate an acknowledgment message;
     calculate a time of departure for the acknowledgment message based on the RTT value; and
     send, with the transceiver, the acknowledgment message at the time of departure.

15. The system of claim 14 wherein the at least one processor is further configured to compute a First Arrival Correction (FAC) for the incoming message.

16. The system of claim 14 wherein the at least one processor is further configured to calculate the time of departure for the acknowledgment message based at least in part on the FAC.

17. The system of claim 14 wherein the at least one processor is further configured to determine a Short Inter-Frame Space (SIFS) value and calculate the time of departure based on the RTT value and the SIFS value.

18. The system of claim 17 wherein the at least one processor is further configured to calculate the time of departure for the acknowledgment message according to:

$$t3 = t2 + SIFS - RTT/2 + L_M$$

wherein,
t3 is the time of departure;
t2 is a time the incoming message is detected;
SIFS is the Short Inter-Frame Space value associated with the access point;
RTT/2 is a time difference between a time instance when the incoming message was sent and a time instance when the incoming message is detected; and
$L_M$ is a length of the incoming message.

19. The system of claim 14 wherein the at least one processor is further configured to determine a message length of the incoming message.

20. The system of claim 14 wherein the at least one processor is further configured to detect a QoSNull message as the incoming message from the access point.

21. A client station comprising:
   a processor;
   a positioning unit coupled to the processor and configured to:
     detect a broadcast message from a first access point indicating a message exchange with a second access point;
     detect a first message, wherein the first message is sent from the first access point to the second access point;
     detect a second message, wherein the second message is sent from the second access point to the first access point;
     determine location information associated with the first access point and the second access point;
     determine a Short Inter-Frame Space (SIFS) value;
     determine a message length value for the first message;
     determine time difference of arrival (TDOA) information based, at least in part, the detecting of the first message and the second message; and
     calculate a position estimate based on the location information associated with the first access point and the second access point, the TDOA information, the SIFS value, and the message length value.

22. The client station of claim 21 wherein the positioning unit is further configured to detect a fine timing message as the first message.

23. The client station of claim 21 wherein the positioning unit is further configured to detect a QoSNull message as the first message.

24. The client station of claim 21 wherein the positioning unit is further configured to detect the location information associated with the first access point and the second access point in the broadcast message.

25. The client station of claim 21 wherein the positioning unit is further configured to detect Round Trip Time (RTT) information associated with the first access point and the second access point in the broadcast message.

26. The client station of claim 21 wherein the positioning unit is further configured
   to detect the SIFS value in the broadcast message.

* * * * *